United States Patent [19]

Nicholas

[11] Patent Number: 4,500,890
[45] Date of Patent: Feb. 19, 1985

[54] GRAPHIC RECORDING SYSTEM

[75] Inventor: Rodney G. Nicholas, Berkeley, Calif.

[73] Assignee: Nicolet Instrument Corporation, Madison, Wis.

[21] Appl. No.: 410,504

[22] Filed: Aug. 23, 1982

[51] Int. Cl.³ .............................................. G01D 9/40
[52] U.S. Cl. .................................. 346/29; 346/139 R
[58] Field of Search ........... 346/29, 64, 139 R, 140 R, 346/141; 400/124

[56] References Cited

U.S. PATENT DOCUMENTS

| | | | |
|---|---|---|---|
| 3,145,070 | 8/1964 | Miller et al. | 346/29 |
| 3,550,276 | 12/1970 | Kramer et al. | 346/64 |
| 3,771,034 | 11/1973 | Cless | 346/29 |

Primary Examiner—A. D. Pellinen
Assistant Examiner—Todd E. DeBoer
Attorney, Agent, or Firm—Kinney & Lange

[57] ABSTRACT

A graphic recording system wherein multiple recording elements are moved relative to a recording medium. The recording elements are selectively actuated for recording on the medium. A carriage supports the recording elements with the carriage and a recording element actuator being supported for movement relative to the recording medium and each other. During recording on the medium, the relative movement between the carriage and actuator is prevented.

20 Claims, 3 Drawing Figures

GRAPHIC RECORDING SYSTEM

DESCRIPTION

BACKGROUND OF PRIOR ART

Graphic recorders are known to the prior art. Typically, such recorders employ a pen or other similar recording element which is movable relative to a moving recording medium, the combined movement of the recording element and medium being controlled to produce a desired representation.

The use of multiple pens for such purposes as multicolor plotting are known to the prior art. An example of such a system is disclosed in U.S. Pat. No. 3,401,401 issued Sept. 10, 1968, to Read et al for MULTIPLE PEN PLOTTER CARTRIDGE, which is hereby incorporated by reference. The disclosed Read embodiment employs four pens which may be independently selected for color selection, for example. However, the selection of each pen requires the activation of a different pen actuating device. Thus, the movable support for the pens must also support and move an independent actuating device for each pen. The overall mass of the moving support contributed by the multiple pens and independent actuating elements has placed a practical limit of four pens on this technique.

An attempt to overcome the mass problems of multiple pen graphic recorders is disclosed in U.S. Pat. No. 4,135,245 issued Jan. 16, 1979, to Kemplin et al for PLOTTER WITH AUTOMATIC PEN-CHANGER, which is hereby incorporated by reference. The Kemplin system, like similar prior art systems, employs a pen repository, at which multiple pens are maintained, and a single pen recording head. The pen which is immediately desired for recording purposes is retrieved from the repository after which the recording operation is initiated. When a pen change is desired, the recording operation stops and the recording head returns the pen it has utilized to the repository where it also retrieves an alternative pen, according to instructions. While this does reduce the mass of the recording head by the mass of those pens not in use, together with associated actuating and supporting structures, it increases the recording time by the amount of time necessary to return a previously utilized pen and to retrieve a pen that it is desired to use.

Systems meeting the general description of the two systems described above are in common use. Since such systems are typically numerically controlled, each has qualities which frustrate the capabilities of the control systems. For example, heavier masses require heavier mechanisms for moving that mass which may lead to difficulties in acceleration speed as well as precision. Greater time requirements (i.e., the pen retrieval, for example) introduce a delay not required by the control system.

BRIEF SUMMARY OF THE INVENTION

The present invention provides a graphic recording system having a multiple pen capability without the mass required by the actuating systems of some prior art devices, as noted above, and without the delays introduced by a pen retrieval operation, also as noted above. This is accomplished by the use of a multiple pen carriage which is movable relative to a recording medium and an actuator movable with the carriage during recording but movable relative to the carriage for pen selection. Thus, a single actuator may be employed to actuate multiple pens thereby eliminating the need for, and the mass of, multiple actuators. Also, the need for a retrieval operation is eliminated.

In a preferred embodiment, a carriage carries multiple recording elements. A single actuator and the carriage are supported for movement relative to a recording medium and each other. A mechanism is provided to selectively move at least one of the carriage and actuators relative to the other while selectively preventing the relative movement between the carriage and actuator during recording. In this manner, the actuator may be positioned relative to the carriage to actuate a desired pen after which the pen may be moved relative to the recording medium, together with the carriage and actuator. In the disclosed embodiment, only the carriage is moved relative to the actuator.

Proper pen selection and control requires registration between the carriage and actuator. In a preferred embodiment, this is accomplished by a rack carried by the carriage with a finger system carried by the actuator engaging the rack to prevent relative movement between them. The finger system may be resiliently biased into engagement with the rack to be disengaged from the rack when a relative movement between the carriage and actuator is desired. The carriage and actuator may be supported in any desired manner, a preferred manner being support by a common dual track in nesting relation to each other. Relative movement between the carriage and actuator may be facilitated by a drive for each or, alternatively, a single drive for one with a cooperating system to prevent movement of the other during a change in registration. This latter may be accomplished through the use of a braking system or sufficient friction to prevent nondriven movement.

DETAILED DESCRIPTION OF INVENTION

Figure 1:
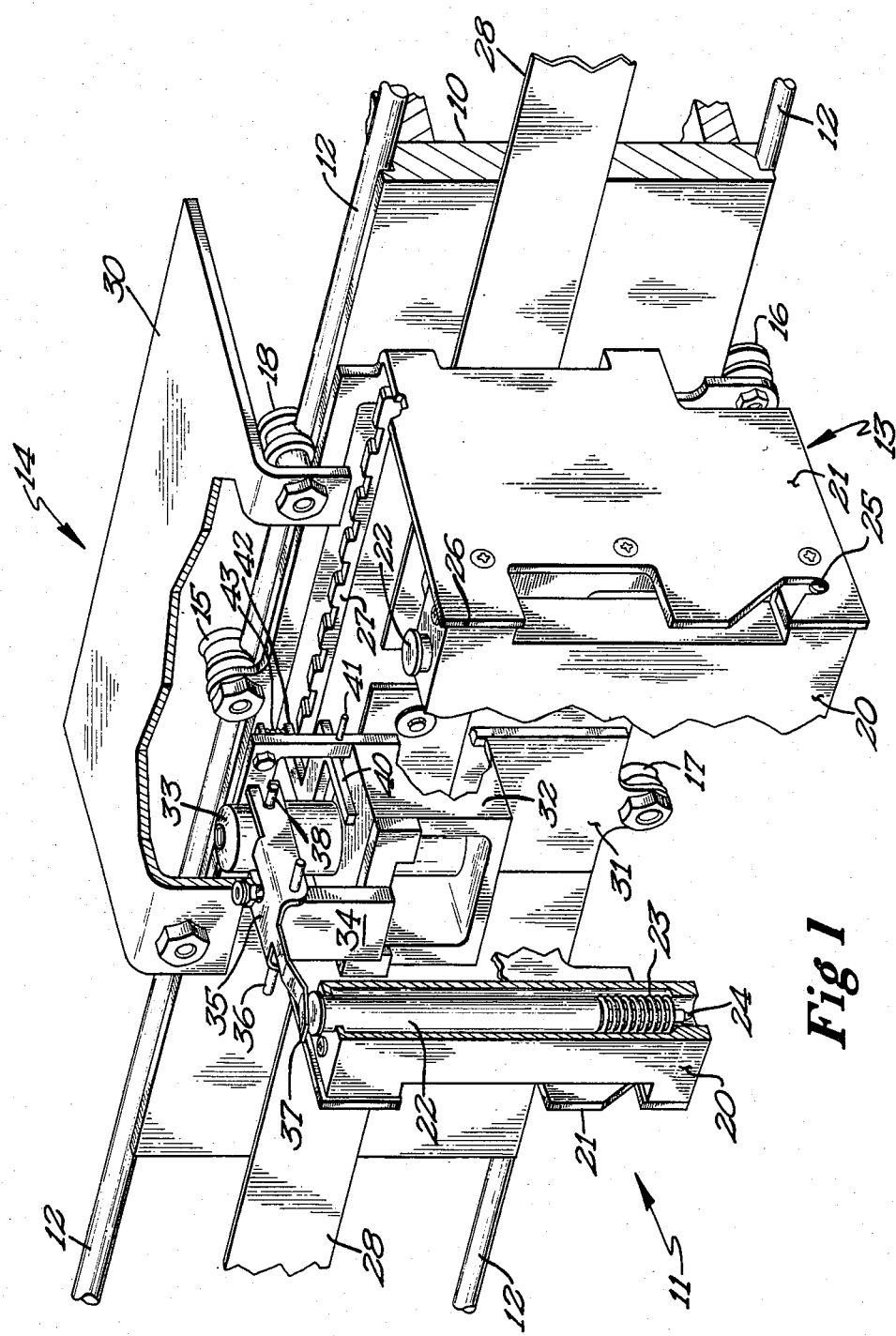
FIG. 1 is a partially cutaway perspective illustrating a preferred embodiment of the present invention.

FIG. 1 illustrates a portion of a graphic recording system in accordance with the present invention, including a rail 10. Rail 10 is supported within the graphic recorder and runs generally longitudinal to the direction of movement of the recording media. Typically, the media is a paper or other similar material carried on a drum or supported over a spindle at the location where the recording takes place. Supported on the rail 10, in a manner to be described more fully below, is a pen or recording element assembly indicated generally at 11. The assembly 11 moves along the rail 10 and is guided and supported by tracks 12.

The assembly 11 includes a carriage and an actuator indicated generally at 13 and 14, respectively. The carriage 13 is supported for movement along the rail 10 by a rolling contact 15 cooperating with the upper track 12 and at two rolling contacts 16 (one shown in FIG. 1) cooperating with the lower track 12. Similarly, the actuator 14 is supported for movement along the rail 10 by one rolling contact 17 cooperating with the lower track 12 and two rolling contacts 18 (one shown in FIG. 1) cooperating with the upper track 12. In this manner, the carriage 13 and actuator 14 are supported for movement along the rail 10 independently of each other and, accordingly, may be moved relative to each other and relative to a recording medium that lies generally under the rail 10 and is movable in directions transverse to the major dimension of the rail 10. As illustrated, each of the carriage 13 and actuator 14 are supported by three point contacts with three of those contacts cooperating with the upper track 12 and three cooperating with the lower track 12. While rollers are illustrated, other support systems may be employed, as desired.

The carriage 13 carries and supports a pen block 20. Carriage 13 may be formed of a generally U-shaped member having one wall extending between the roller 15 and the rollers 16 and lying generally along the rail 10 and two generally opposing walls 21 extending generally perpendicular to the rail 10. The pen block 20 spans the space between the walls 21. Any number of pens 22 may be supported within the pen block 20 to be resiliently biased, as by a spring 23, in an inoperative or retracted position. Actuation of a pen 22 requires a depression of that pen against the spring 23 to compress the spring and force a point 24 of the pen 22 into contact with the recording medium that underlies it. Each of the pens 22 has an associated spring 23 and point 24.

As illustrated in FIG. 1, the pen block 20 may be supported for removal from the carriage 13 as by a pin 25 cooperating with each of the walls 21 and with a friction fit at the upper end of the pen block 20, as at 26. Snap clips may also be employed to secure the block 20. Pen block 20 may be removed by a force applied against the friction at 26 and a subsequent removal of the pins 25 from a cooperating slot within the walls 21. A rack 27 is carried by the carriage 13 along that wall of the carriage 13 that lies along the rail 10 with a band 28 forming a portion of a band drive also being secured to that wall.

The actuator 14 includes an upper plate 30 which provides a support for the rollers 18 in any convenient manner. The plate 30 includes a tongue 31 extending to and supporting the lower roller 17. Extending from a portion of the tongue 13 is an actuating mechanism including a housing 32 which supports a dual action solenoid 33 and an upstanding support 34. The support 34 provides a pivot connection to a rocker arm 35 via a pin 36, in known manner. The rocker arm 35 includes a tongue 37 which extends over the pen block 20 to engage and depress a selected pen 22 with which it is in registration. Thus, the rocker arm 35 actuates the pens 22 for recording and may be moved, on movement of the actuator 14, into registration with any of the pens 22 within block 20. Movement of the rocker arm 35 is induced by the solenoid 33 which is connected to the rocker arm 35; as by a pivot connection provided by a pin 38. On retraction of the solenoid 33 (tongue 37 in the upmost position), the pin 38 will engage fingers 40 on either side of the solenoid 33 (one shown in FIG. 1) the fingers 40 forming a part of a locking mechanism in cooperation with the rack 27. Fingers 40 extend to a pivot connection 41 from which a finger 42 extends. The finger 42 is resiliently biased into engagement with the rack 27 by a spring 43 and is configured to lie between the projections on the rack 27. The projections of the rack 27 are positioned to establish and maintain registration between the actuator 14, and its tongue 37, and a selected pen 22 carried by the pen carriage 13.

Figure 2:
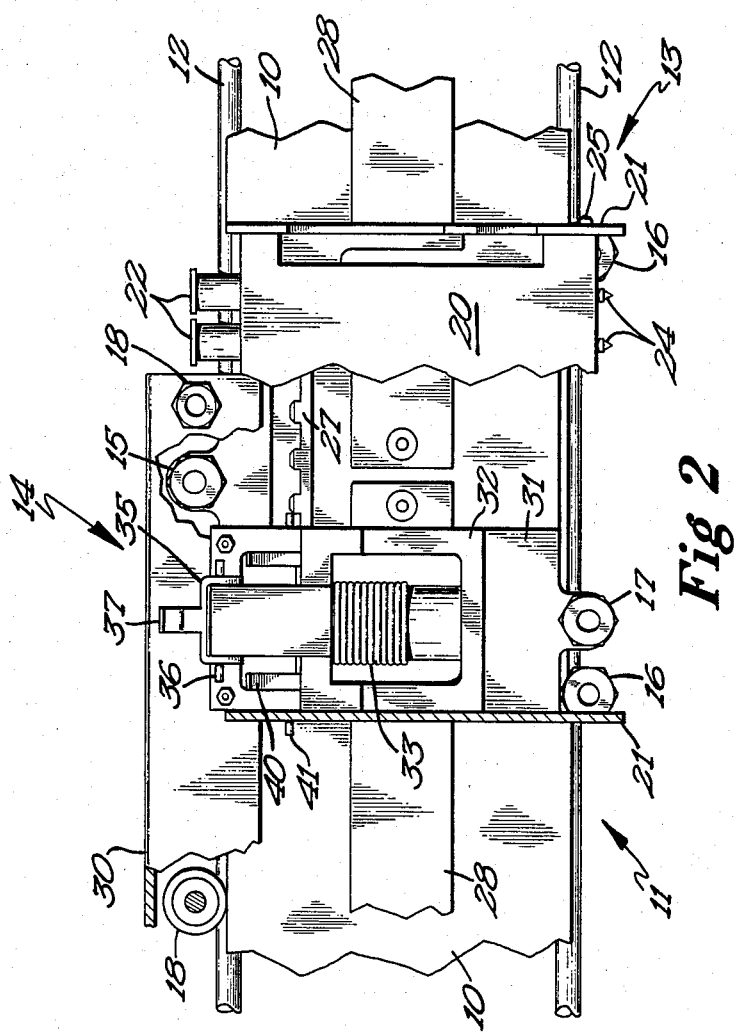
FIG. 2 is a partially cutaway front view of the preferred embodiment of the present invention.

FIG. 2 is a front view of the embodiment of FIG. 1 which illustrates some portions of that embodiment that are not fully illustrated in FIG. 1. In the embodiments of FIGS. 1 and 2, the actuator 14 is nested within the carriage 13 and, in the embodiment of FIG. 2, the actuator 14 is in abutment with the leftmost wall 21. The actuator 14 may be moved independently of the carriage 13 by a band similar to the band 28 and suitable associated drive mechanisms. Alternatively, either the carriage 13 or actuator 14 may be moved by any other desired moving mechanisms including stepper motors, lead screws, etc. In the illustrated embodiment, and with the finger 42 out of engagement with the rack 27, a force imparted to the band 28 will induce a movement of the carriage 13 while friction between the roller contacts 17 and 18 and the tracks 12 will maintain the actuator 14 stationary. Alternatively, the finger 42 may have sufficient extension such that it will frictionally engage the rail 10 when out of engagement with the rack 27 to provide a braking action to the actuator 14 on movement of the carriage 13. Of course, either or both of the carriage 13 and actuator 14 may be moved relative to the other to properly position the actuator 14 relative to a desired one of the pens 22. If both the carriage 13 and actuator 14 are driven, one of those drives may be employed to provide a braking action. The entire assembly may be moved, during a recording operation, by a lead screw in accordance with conventional practice.

Figure 3:
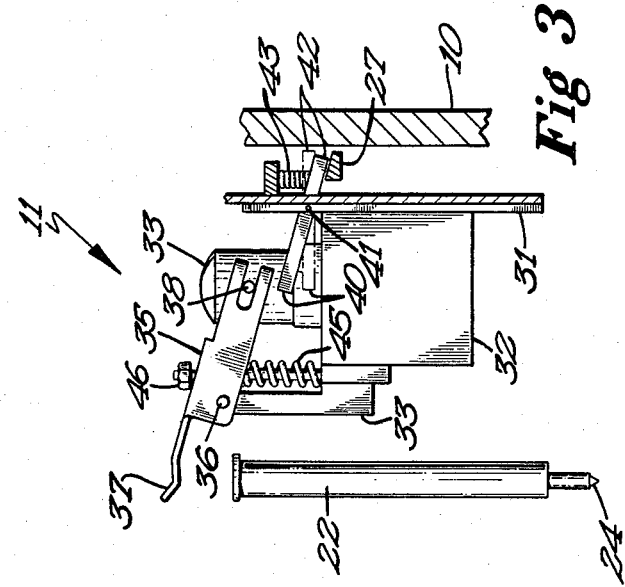
FIG. 3 is a side view illustrating the operation of a portion of the embodiment of FIGS. 1 and 2.

FIG. 3 is a side view illustrating, in greater detail, the operation of the actuator 14. In FIG. 3, the solid representation of the member including arms 40 and 42 shows the arms 42 in engagement with the rack 27 under the resilient urging of the spring 43. The phantom representation shows the position of that element when the arms 40 are engaged by the pin 38 on retraction of the solenoid 33, as described above. The position of the rocker arm 35 illustrated in FIG. 3 is the "rest" position of that rocker arm as established by a bias spring 45. The bias spring 45 is maintained in position by a shaft extending through its central core which has a threaded end engaged by a nut 46, the nut 46 providing a stop for the movement of the rocker arm 35. A bushing may be provided on that same shaft adjacent the nut 46, and on top of the spring 45, to cooperate with the rocker arm 35 by friction to provide a stable "actuating" position for the rocker arm 35.

Obviously, many modifications and variations of the present invention are possible in light of the above teachings. For example, as noted above, various drive mechanisms and techniques may be employed to provide a relative movement between the carriage 13 and actuator 14 for registration of the actuator 14 with a desired one of the pens carried by the carriage 13. Indeed, any recording element requiring a mechanical actuation may be employed within the present invention without departing from the scope thereof. Of course, multiple actuators may be employed to advantage so long as there are fewer actuators than recording elements. Alternative supporting tracks or other devices may be employed for each of the carriage 13 and actuator 14 while the carriage 13 may be nested within the actuator 14. The solenoid 33 may be replaced by any linear power mechanism. It is therefore to be understood that, within the scope of the appended claims, the invention may be practiced otherwise than as specifically described.

What is claimed is:

1. In a graphic recording system of the type wherein a plurality of recording elements are moved relative to a recording medium and having means for selectively actuating said recording elements for recording on said medium, the improvement which comprises:

carriage means for carrying said recording elements;

means, including rail means, independently supporting said carriage means and said actuating means for movement relative to said recording medium and each other along said rail means;

means selectively moving at least one of said carriage means and actuating means relative to the other along said rail means for recording element selection; and means selectively locking said carriage means and said actuating means for movement together by said selectively moving means during recording.

2. The graphic recording system of claim 1 wherein said selectively moving means comprises means for moving said carriage means.

3. The graphic recording system of claim 1 wherein said means selectively locking comprises means for establishing and maintaining operative registration between said actuating means and the recording elements supported by said carriage means.

4. The graphic recording system of claim 3 wherein said registration establishing and maintaining means comprises rack means carried by said carriage means and finger means carried by said actuating means, said finger means selectively engaging said rack means.

5. The graphic recording system of claim 4 wherein said finger means are resiliently biased into engagement with said rack means.

6. The graphic recording system of claim 5 wherein said actuating means comprises rocker arm means and dual action linear power means connected to said rocker arm means, said linear power means including means for selectively overcoming the resilient bias of said finger means.

7. The graphic recording system of claim 6 wherein said selectively moving means comprises means for moving said carriage means.

8. The graphic recording system of claim 1 wherein said supporting means comprises means supporting said actuating means in nesting relation with said carriage means.

9. The graphic recording system of claim 1 wherein said supporting means comprises common dual track means, said actuating means being supported by said track means within said carriage means.

10. The graphic recording system of claim 9 wherein said supporting means further comprises three point contact means supporting each of said carriage means and actuating means on said dual track means, each of said dual track means cooperating with three of said point contact means.

11. The graphic recording system of claim 10 wherein said point contact means comprise rolling contact means.

12. The graphic recording system of claim 11 wherein said means selectively locking comprises means for establishing and maintaining operative registration between said actuating means and the recording elements supported by said carriage means.

13. The graphic recording system of claim 12 wherein said registration establishing and maintaining means comprises rack means carried by said carriage means and finger means carried by said actuating means, said finger means selectively engaging said rack means.

14. The graphic recording system of claim 13 wherein said finger means are resiliently biased into engagement with said rack means.

15. The graphic recording system of claim 14 wherein said actuating means comprises rocker arm means and dual action linear power means connected to said rocker arm means, said linear power means including means for selectively overcoming the resilient bias of said finger means.

16. The graphic recording system of claim 15 wherein said selectively moving means comprises means for moving said carriage means.

17. The graphic recording system of claim 16 further comprising brake means for selectively preventing movement of said actuating means.

18. The graphic recording system of claim 16 further comprising means for preventing non-selective movement of said actuating means.

19. The graphic recording system of claim 1 further comprising means for preventing non-selective movement of said actuating means.

20. The graphic recording system of claim 1 wherein said selectively moving means and said selectively locking means each comprise drive means.

* * * * *